United States Patent [19]

Kojima et al.

[11] Patent Number: 4,989,198
[45] Date of Patent: Jan. 29, 1991

[54] BEAM CONTROL DEVICE UTILIZING BEAM HAVING A SPECIFIC DIRECTION OF POLARIZATION TO CONTROL A LASER USED IN AN OPTICAL MEMORY SYSTEM

[75] Inventors: Kunio Kojima, Nara; Daiji Yamane, Yamatokoriyama; Noriaki Sakamoto, Souraku, all of Japan

[73] Assignee: Sharp Kabushiki Kaisha, Osaka, Japan

[21] Appl. No.: 186,946

[22] Filed: Apr. 27, 1988

[30] Foreign Application Priority Data

Apr. 28, 1987 [JP] Japan .................. 62-107105

[51] Int. Cl.⁵ .............................. G11B 7/00
[52] U.S. Cl. ........................................ 369/116
[58] Field of Search ............ 369/106, 110, 116; 258/205, 225; 346/76 L

[56] References Cited

U.S. PATENT DOCUMENTS

| | | |
|---|---|---|
| 4,583,210 | 4/1986 | Winslow . |
| 4,611,318 | 9/1986 | Winslow . |
| 4,660,189 | 4/1987 | Tsukamura et al. .............. 369/116 X |
| 4,750,161 | 6/1988 | Takeuchi et al. ................. 369/116 X |
| 4,796,267 | 1/1989 | Yamada et al. ................... 369/116 X |
| 4,881,216 | 11/1989 | Deguchi et al. ................. 369/116 X |

FOREIGN PATENT DOCUMENTS

| | | | |
|---|---|---|---|
| 2386165 | 3/1978 | France . | |
| 2399086 | 8/1978 | France . | |
| 59-98334 | 6/1984 | Japan | 369/110 |
| 59-98335 | 6/1984 | Japan | 369/110 |
| 60-143438 | 7/1985 | Japan | 369/116 |
| 60-239925 | 11/1985 | Japan | 372/38 |
| 60-239929 | 11/1985 | Japan | 369/116 |
| 61-239684 | 10/1986 | Japan . | |
| 61-260694 | 11/1986 | Japan . | |
| 62-89248 | 4/1987 | Japan | 369/116 |
| 1462792 | 1/1977 | United Kingdom . | |

Primary Examiner—Donald McElheny, Jr.

[57] ABSTRACT

Method and device of beam control for stabilizing the laser beam output is controlled by adjusting the driving current of laser beam source. To adjust the driving current output light from laser beam source is detected by a photo detector. This output light has the same specific polarization components the light used to record or read from a magnetic optical disc. The detected light is converted into an electric signal corresponding to the light intensity. This electric signal is compared with a specified reference level to determine the change in the output level of the laser source due to a change in the ambient temperature.

5 Claims, 4 Drawing Sheets

FIG. 2
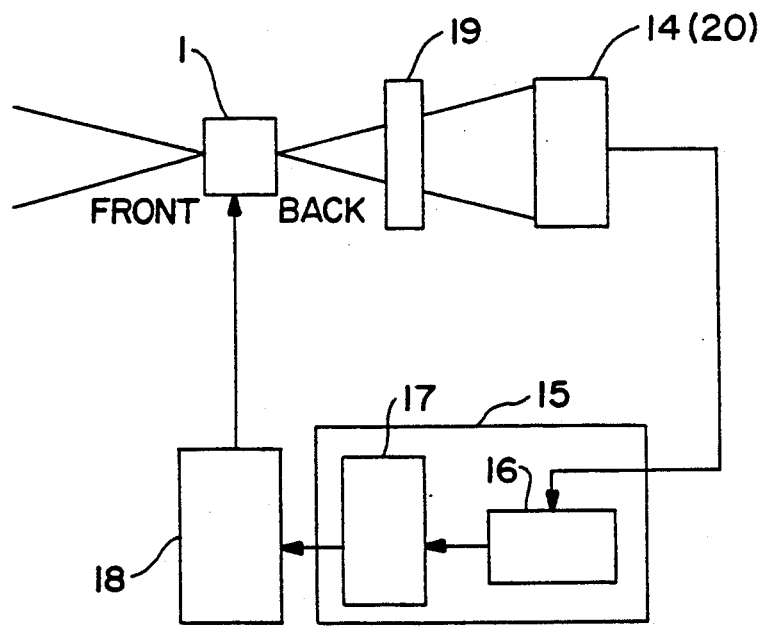
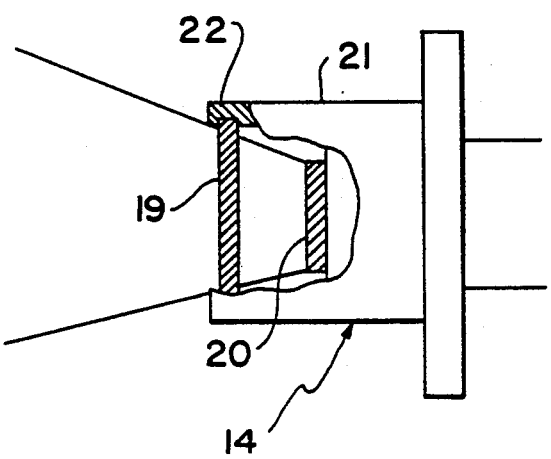
FIG. 3

BEAM CONTROL DEVICE UTILIZING BEAM HAVING A SPECIFIC DIRECTION OF POLARIZATION TO CONTROL A LASER USED IN AN OPTICAL MEMORY SYSTEM

BACKGROUND OF THE INVENTION

The present invention relates to an optical memory system for recording, reading or erasing information by irradiating an optical disc such as magneto-optical disc, with light emitted from a semiconductor laser, and more particularly, to a beam control device of a semiconductor laser used in an optical memory system and the control method thereof.

Recently optical discs, magneto-optical discs and many others have been developed as systems making use of laser beam.

For example, a magneto-optical disc memory device is an optical recording and reading apparatus for recording, reading or erasing by using a magnetic film having an axis of easy magnetization perpendicular to the surface of the magnetic film as the recording medium, and irradiating it with a laser beam. The recording and reading methods of a magneto-optical disc memory device are explained below.

In recording, the information is recorded as follows. A laser beam focused to a spot of a diameter of about 1 μm is modulated in intensity depending on the information signal and is emitted to the magnetic film surface to elevate the temperature of the magnetic film locally. In this heated area, the coercive force decreases, and therefore, when an auxiliary magnetic field is applied simultaneously from an outside source, the direction of a magnetization is inverted, and the information is recorded.

In reading, on the other hand, the recorded magnetic film surface is irradiated with al linearly polarized light of laser beam having a smaller quantity of light than when recording. As a result, the reflected light produces an inclination of polarization due to the magneto-optical effect of magnetic film (Kerr effect). This inclination is passed through an analyzer to be converted into a change in intensity of light. When the change is detected by a photo detector, a read out signal is obtained.

The light intensity of laser beam requires two output levels, that is, high and low, as discussed above. Namely, the output light intensity level is high when recording (erasing), and is low when reading.

The semiconductor laser emitting a laser beam possesses a temperature characteristic, that varies intensity of laser beam depending on the ambient temperature. In other words, when the ambient temperature changes, the ratio of polarization (the light intensity of P-polarized component/the light intensity of S-polarized component) fluctuates. When the high output light intensity of laser beam varies in the information recording mode, insufficient or excessive writing of information on the recording medium may occur, thereby deteriorating the reliability of the read out information. On the other hand, when the low output light intensity varies in information reading mode, the S/N ratio of the read out signal deteriorates. Therefore, it is necessary to stabilize the light intensity of laser beam at both high and low output levels.

Therefore, conventionally, in this sort of system, the output light from the laser light source is detected by a monitor detector, and the driving current of the laser light source is controlled depending on this result of detection so as to stabilize the laser beam output.

For example, generally, the laser beam is controlled in the following two manners.

(1) The method of recording the laser beam oscillated from the back side of a resonator of semiconductor laser by a photo detector for monitoring and controlling the output light intensity at the front side of the resonator on the basis of the light intensity information obtained from this photo detector.

(2) The method of recording part of the output light at the front side of a resonator of semiconductor laser by using a beam splitter or the like by a detector for monitoring and controlling the output light intensity at the front side of the resonator on the basis of the light intensity information obtained from this detector.

Anyway, in the systems making use of laser beam, it is general to extracting only a specific polarized component in a laser beam. For example, in a magneto-optical system, the information is recorded or read out by using the P-polarized component of the laser beam.

In such conventional laser beam controlling methods, however, since the light entering the photo detector for monitoring contains other polarized components aside from a specific polarized component, the light intensity information obtained in the photo detector for monitoring includes light intensity information obtained on the basis of other polarized components other than the actually required specific polarized component.

Accordingly, in an optical system for recording, reading and/or erasing the information by a laser beam of a specific polarized component, when the laser beam is controlled by light intensity information including light intensity information other than the specific polarized component, the laser beam of the specific polarized component delivered from the laser is influenced by the light intensity of other polarized components, so that the laser beam may not be controlled accurately. That is, the light intensity of laser beam necessary for recording, reading and/or erasing cannot be applied to the optical disc.

In a system using a laser beam of specific polarized component, a more accurate control of the output of laser beam may be realized by obtaining the light intensity information acquired by utilizing a photo detector for monitoring the specific polarized component being used (the P-polarized component in a magneto-optical system) and controlling according to this light intensity information. It is possible to control accurately the specific polarized component in the laser beam outputted from the laser to the optical disc.

Below, in the magneto-optical system in which a specific polarized component is a P-polarized component, possible problems are discussed.

In the conventional method, the light entering the photo detector for monitoring contains both P-polarized component and S-polarized component. Therefore, if the ratio of the P-polarized component to the S-polarized component in the laser beam the polarization ratio) is always constant, the laser beam output light intensity of the P-polarized component can be controlled by the methods (1), (2) above. Actually, however, since the polarization ratio increases or decreases depending on the changes of the ambient temperature of the laser, the conventional light intensity information from the photo detector for monitoring comprising the P-polarized component and S-polarized component is different from the light intensity of the laser beam of the actually used P-polarized component (the light intensity of laser beam outputted to the magneto-optical disc). This phenomenon occurs not only due to variations of the polarization ratio, but also due to rotation of the direction of polarization of the laser output beam.

FIG. 4 shows the relationship between laser driving current (I) and laser output intensity (power) at various ambient temperatures (Tc) of the semiconductor laser. As understood from this diagram, when the temperature rises, the driving current must be increased in order to obtain a specified laser output intensity (for example, about 3 mW when reading, or about 30 mW when recording or erasing).

If the laser is driven at a driving current I' (mA) and the ambient temperature of the laser (T° C.) is not changed, the laser output comprising both P-polarized component and S-polarized component becomes a specified level P1. If the laser is driven at the same driving current (I') and the laser ambient temperature (T) rises, the laser output is lower than level P1, or if the laser ambient temperature (T) drops, the laser output is higher than level P1 (FIG. 5 (1)). Meanwhile, the polarization ratio remains constant if the laser is driven by the driving current I' (mA) and the laser ambient temperature (T° C.) does not change. At this time, as for the P-polarized component, the light intensity of laser beam is a specified level P2. If the laser is driven by the same driving current and the laser ambient temperature rises, the light intensity of laser beam of P-polarized component is lower than level P2, and if the laser ambient temperature drops, the light intensity of laser beam of P-polarized component is higher than level P2 (FIG. 5 (2)).

Thus, according to the conventional stabilizing method of light intensity of laser beam, that is, when the light intensity of laser beam comprising both P-polarized component and S-polarized component are detected by a photo detector for monitoring, and the laser driving current is controlled according to this result of detection, the light intensity of laser output comprising the P-polarized component and S-polarized component can be maintained at a specified level of P1 at each temperature as shown in FIG. 6 (1). But the light intensity of P-polarized component is influenced by the S-polarized component because the light intensity of laser beam is controlled by detecting both P-polarized component and S-polarized component, and it cannot be kept at a specified level of P2 as shown in FIG. 6 (2), that is, the light intensity of laser beam is higher than level P2 when the laser ambient temperature is lower, and is lower than level P2 when the laser ambient temperature is higher. Therefore, in spite of correction of the light intensity of laser beam, the light intensity of the P-polarized component in the laser beam given from the laser to the magneto-optical disc cannot be adjusted to the specified level P2, so that the temperature variations may adversely affect reading recording or erasing as stated above. Incidentally, the graphs in FIGS. 5 (1), (2) and FIGS. 6(1), (2) schematically show the increase and decrease due to temperature changes.

Thus, conventionally, since the light intensity information from the photo detector for monitoring is different from the actually used light intensity, it is impossible to control the light intensity of laser beam accurately by the control on the basis of the above light intensity information.

SUMMARY OF THE INVENTION

It is hence a primary object of this invention to present a beam control device and a control method thereof of the laser for controlling the laser beam output from a laser light source by detecting a light beam having a specific direction of polarization to be used actually out of the output light from the laser light source by solving the above problems.

It is another object of this invention to stabilize the beam output accurately by obtaining light intensity information by detecting a light beam having a specific direction of polarization to be used actually out of the output light from a laser light source by a photo detector, and controlling on the basis of the light intensity information.

Other objects and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a beam control device for an optical memory system comprises a laser for reading, recording and/or erasing the information, means for applying a driving current to drive the laser, means for substantially selecting only the light beam having a specified direction of polarization out of the laser beam oscillated from the laser, means for detecting a light intensity of the light beam having the specific direction of polarization obtained by the selecting means and converting it into an electric signal, and means for delivering a control signal in order to vary the driving current to the means for applying the driving current on the basis of the electric signal obtained by the converting means.

According to another embodiment of the present invention, the laser beam output stabilizing method converts the output light intensity from the laser beam source into an electric signal by means of a photo detector, and controls the driving current of the laser beam source by comparing its signal output with a predetermined reference level. At this time, from of the outputted light from the laser beam source, only the light beam having a specific direction of polarization is detected by the photo detector in order to control the laser beam output stably.

This invention also presents a photo detector for use is stabilizing method of laser beam output, comprising means for selecting only the light beam possessing a specific direction of polarization from the received light beams, and entering it into the receiving plane.

BRIEF DESCRIPTION OF THE DRAWINGS

The present invention will become more fully understood from the detailed description given hereinbelow and the accompanying drawings which are given by way of illustration only, and thus are not limitative of the present invention and herein:

FIG. 2 is a structural drawing showing a beam control device in another embodiment of the present invention;

FIG. 3 is a structural drawing of a photo detector for monitoring integrally incorporating a polarizer;

DETAILED DESCRIPTION OF THE EMBODIMENTS

The present invention relates to an optical memory system for recording, reading and/or erasing information by extracting only a light beam of a specific polarized component of the laser beam from a semiconductor laser or the like, and using this light beam of specific polarized component. In particular, the present invention relates to a magneto-optical system for recording, reading and/or erasing the information by using P-polarized component of laser beam.

Figure 1:
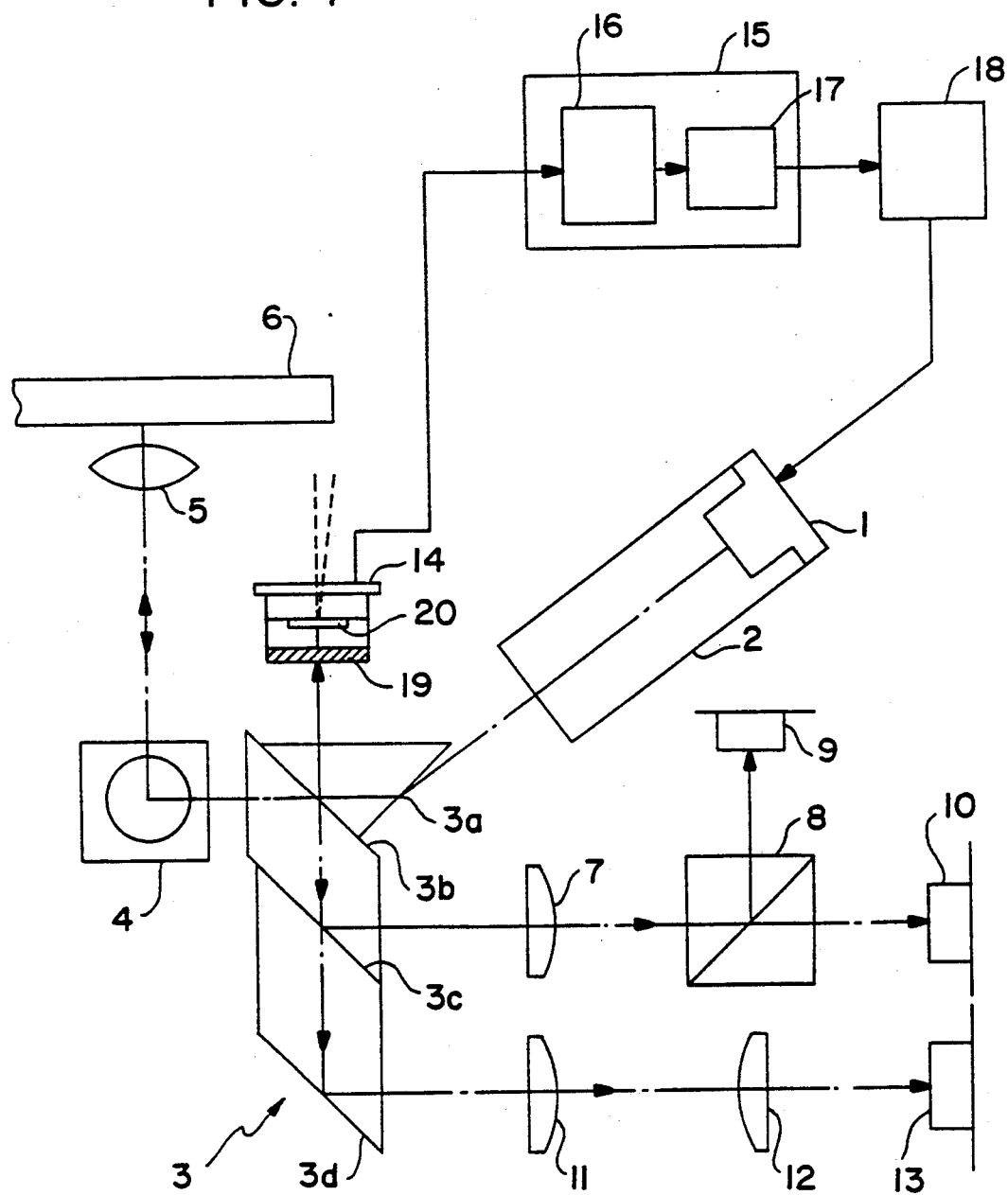
FIG. 1 is a structural drawing of an optical pickup system for of an optical disc having a beam control device according to one embodiment of the present invention.
Figure 4:
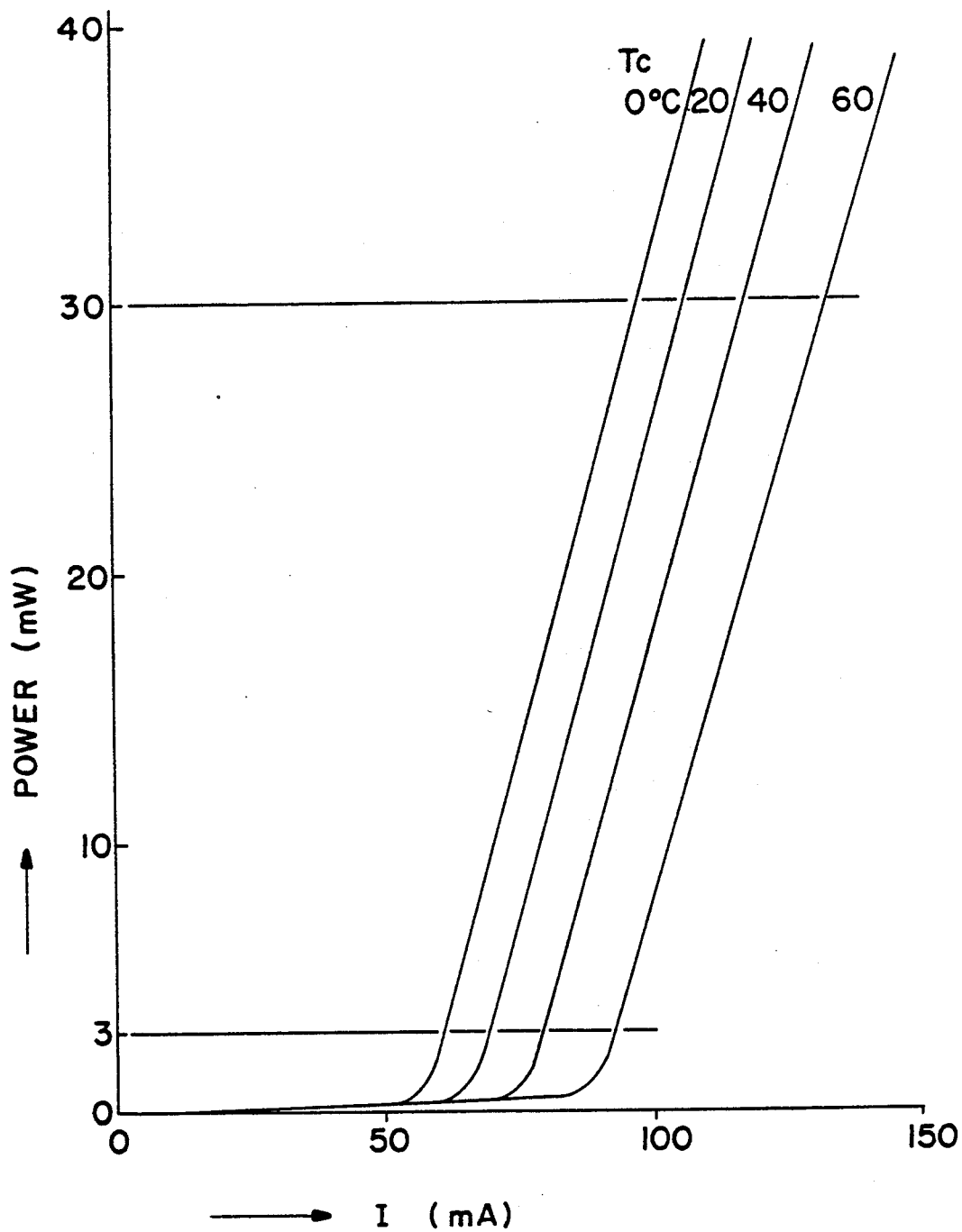
FIG. 4 is a diagram showing the relationship between laser beam output light intensity and driving current at various ambient temperatures of a semiconductor laser.

FIG. 1 is a structural drawing of an optical pickup of an optical disc containing a beam control device in one of the embodiments of the present invention. The present invention is described below by referring to an example of a magneto-optical system using P-polarized component of laser beam.

In FIG. 1, a semiconductor laser 1 is a light source for generating a laser beam when recording, reading and/or erasing, and the light intensity of laser beam is modulated. For example, the semiconductor laser 1 may be oscillated at a wavelength of about 780 nm. Furthermore, the system of the optical pickup comprises a collimator lens 2, a composite prism 3, an epi-illumination mirror 4, an objective lens 5, an optical disc (a magneto-optical disc( 6, spot lenses 7 and 11, a polarizing beam splitter 8, RF signal detectors 9 and 10, a cylindrical lens 12, an optical servo detector 13, a photo detector for monitoring 14, an optical output control circuit 15, and a driving current circuit 18.

In particular, the beam control device of the present invention functioning as a beam output stabilizing device includes the photo detector for monitoring 14 composed of an optical part capable of selecting a direction of polarization for passing substantially only the laser beam of a specific polarized component, for example, a polarizing plate 19 and a photovoltaic transducer 20 for converting the light intensity of an inputted laser beam of specific polarized component into an electric signal; the optical output control circuit 15 having a comparator 16 for comparing the electric signal obtained in the photo detector for monitoring 14 with a preset reference value and detecting the difference and a control circuit 17 for delivering a driving current control signal for controlling the driving current of the laser 1 in order to correct the difference on the basis of the result of the comparison of the comparator 16; and the driving current circuit 18 for variably supplying the driving current to the laser 1 depending on the driving current control signal from the optical output control circuit 15. The driving current circuit 18 varies the driving current depending on the changes in the output from the photo detector for monitoring 14.

As the photovoltaic transducers of photo detectors 9, 10, 13 and 14, for example, pin type photo diode, avalanche photo diode and other photo diodes, and photo transistors, solar cell, or the like may be used.

It is more appropriate to use pin type photo diodes for photo detectors 9, 10, 13 and 14.

The operation of the system shown in FIG. 1 is described below.

First, by the current supplied from the driving current circuit 18, the semiconductor laser 1 is driven, which emits a laser beam of a specified output light intensity (for example, about 3 mW when reading or about 30 mW when recording or erasing). This light intensity of laser beam varies depending on the ambient temperature of the laser 1.

The laser beam emitted from the laser 1 enters the composite prism 3, with the P-polarized component of laser beam at the energy transmissivity of $Tp_1$ or more and the S-polarized component at $Ts_1$ or less, on the input plane 3a of the prism 3 ($Tp_1 > > Ts_1$; for example, $Tp_1 = 90\%$ or more, $Ts_1 = 30\%$ or less). The laser beam entering the prism 3 passes through the polarizing beam splitter 3b, at energy transmissivity of $Tp_2$ by P-polarized component and $Ts_2$ or less by S-polarized component ($Tp_2 > Ts_2$; for example, $Tp_2 = 80\%$, $Ts_2 = 4\%$ or less). The transmitting laser beam leaves the prism 3, is changed in the direction by a specific angle (for example, 45°) by the epi-illumination mirror 4, and is applied to the optical disc 6 by way of the objective lens 5. Here, for example, the light intensity of the laser beam applied to the optical disc is about 1 mW when reading, and about 10 mW when recording or erasing. The laser beam, while passing through the prism 3, is transformed from an ellipsoidal laser beam into a circular laser beam, and becomes a laser beam substantially composed of P-polarized component only. (Actually, the of S-polarized component is slightly applied to the optical disc, but its quantity is almost negligible as compared with the of P-polarized component. Therefore, the S-polarized component is ignored here, and it is assumed that the only P-polarized component is applied to the optical disc, and that the information is recorded, reproduced and/or erased by P-polarized component.)

Under the magneto-optical effect depending on the magnetized state on the disc, the polarization angle of the laser beam of P-polarized component applying to the magneto-optic disc is rotated by the Kerr-rotation angle of the magnetic medium.

The reflected laser beam from the disc is introduced into the composite prism 3 by way of the objective lens 5 and epi-illumination mirror 4, and part of it is transmitted to the laser 1 side through the polarizing beam splitter 3b, while the remaining laser beam is reflected into the beam splitter 3c side. (The transmissivity of each polarized component is as specified above. The reflectivity from each polarized component is described later.)

In the beam splitter 3c, part of the laser beam reflected from the optical disc 6 is applied to the RF signal detectors 9 and 10 through the spot lens 7 and beam splitter 8, and the information signal is processed.

The remainder of laser beam from the beam splitter 3c is applied to the optical servo detector 13 by way of the reflection plane 3d, spot lens 11, and cylindrical lens 12, and the control signal is processed.

The laser beam outputted from the laser 1 is, aside from being led into the optical disc as mentioned above, also reflected by the polarizing beam splitter 3b, at the energy reflectivity of $R_{p1}$ for P-polarized component and $R_{s1}$ or more for S-polarized component ($R_{p1} << R_{s1}$; for example, $R_{p1}=20\%$, $R_{s1}=96\%$ or more).

This reflected laser beam passes through the polarizer 19 and enters the detector for monitoring 14. From the output from this detector 14, the driving of the laser 1 is controlled. In the present invention, before this reflected laser beam enters the detector for monitoring 14, an optical device capable of selecting a laser beam of a specific polarized component, such as a polarizer 19, is provided, so that the laser beam entering the photo detector for monitoring 14 is substantially composed of only the specific polarized component. (In the magneto-optical system, the specific polarized component is the P-polarized component.)

This polarizer 19 allows to pass the laser beam at the energy transmissivity of $T_{p3}$ as for the P-polarized component and $T_{s3}$ as for the S-polarized component ($T_{p3} >> T_{s3}$; for example, $T_{p3}=91.5\%$ or more, $T_{s3}=11.3\%$ or less).

It is ideal that this polarizer 19 can transmit only the P-polarized component (that is, the S-polarized component is completely reflected), but it is impossible to remove the S-polarized component completely because of the manufacturing problem of polarizer and the cost. However, if the S-polarized component can be suppressed sufficiently so that it may not affect the P-polarized component, it is not necessary to make the S-polarized component completely to zero.

The specified polarized component (P-polarized component) entering the photo detector for monitoring 14 through the polarizer 19 is converted from light intensity into an electric signal by the photovoltaic transducer 20 of the photo detector 14. This signal is applied to the comparator circuit 16 of the optical output control circuit 15. The comparator circuit 16 compares a predetermined reference value with the electric signal from the photovoltaic transducer 20, detects the difference, and transmits the result of comparison to the control circuit 17.

The control circuit 17, based on the result of comparison, applies the driving control signal for correcting this difference to the driving current circuit 18. This driving current circuit 18 varies the driving current of the laser 1 depending on the output of the control circuit 17, and applies it to the laser 1.

Therefore, since the laser 1 is driven by the corrected driving current, a constant laser beam of specific polarized component is always applied to the optical disc.

Figure 5:
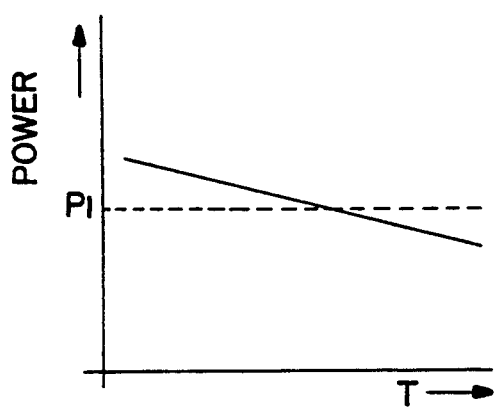
FIGS. 5 (1), 5 (2) are diagrams schematically showing the changes in the light intensity of laser beam output and light intensity of P-polarized component at various ambient temperatures of laser, when the laser is driven at a same driving current.
Figure 5:
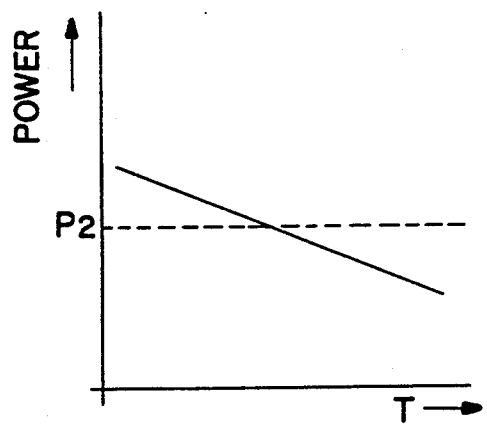
Figure 6:
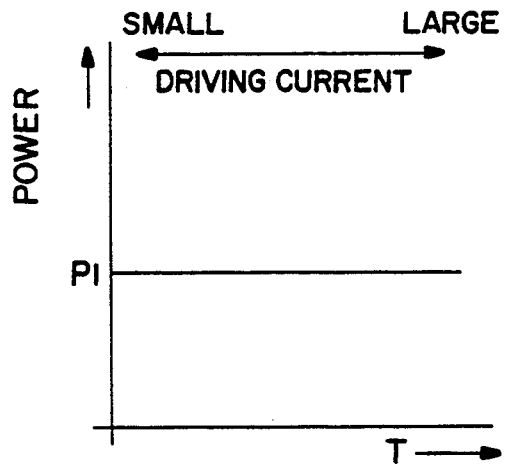
FIGS. 6 (1), 6 (2) are diagrams to explain the control of light intensity of laser beam output and light intensity of P-polarized component by a conventional method.
Figure 6:
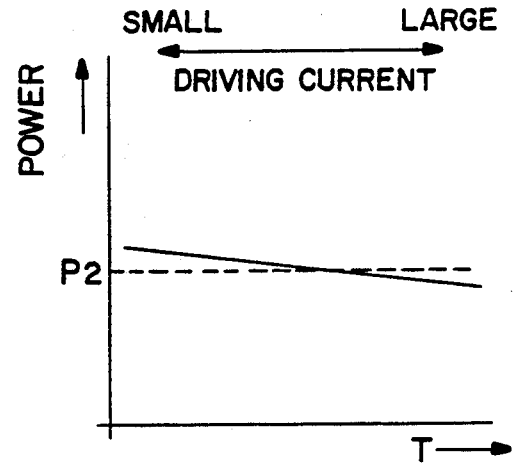

In this way, since the laser beam of specific polarized component is given to the optical disc 6 and photo detector for monitoring 14 at a specified ratio (about 4:1 in this embodiment), by detecting the light intensity of the specific polarized component detected by the photo detector for monitoring 14, and accordingly controlling the driving current of the laser 1, the specific polarized component applied to the optical disc 6 may be kept constant For example, if the ambient temperature of the laser 1 varies as shown in FIGS. 5 (1), (2), conventionally, it is controlled to always keep constant the laser beam containing both P-polarized component and S-polarized component delivered from the laser, thereby not allowing the light intensity of the P-polarized component to be set at the level of P2 as shown in FIG. 6 (2). In the present invention, by contrast, instead of controlling the laser beam delivered from the laser 1 to level P1 as in the conventional art, the light intensity of the specific polarized component applied to the optical disc 6 is controlled to the specified level of P2 as shown in FIG. 7 (2) while monitoring the light intensity of the specific polarized component.

Figure 7:
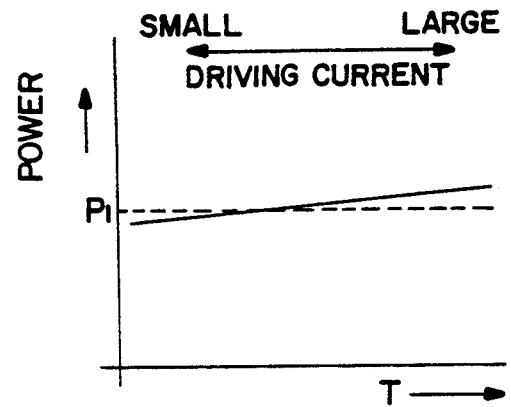
FIGS. 7 (1), 7 (2) are diagrams to explain the control of light intensity of laser beam output and light intensity of P-polarized component by the method of the present invention.
Figure 7:
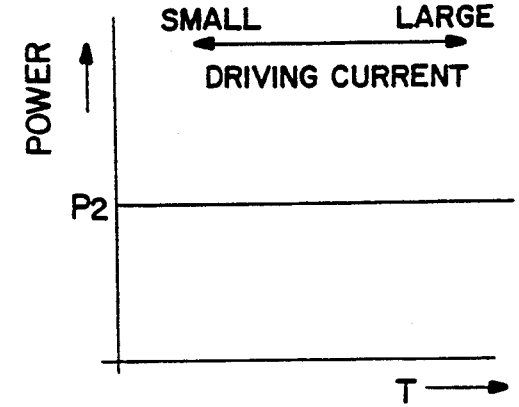

Therefore, in the present invention, when the ambient temperature of the laser is lowered, the driving current is set lower than in the conventional method, and when the temperature becomes higher, the driving current is raised, so that the laser beam delivered from laser 1 is lowered in the light intensity when the ambient temperature is lowered as shown in FIG. 7 (1), and is raised in light intensity when the temperature becomes higher.

Incidentally, the photo detector 14 including the polarizer 19 may be slightly inclined from the optical axis of the laser beam introduced from the prism 3. This is because part of the light supplied into the detector 14 is reflected to affect the passage of other laser beams.

The polarizer 19 may be provided either separately from the photo detector 14 or integrally therewith as described below.

FIG. 2 is a schematic structural drawing of a beam control device in other embodiment of the present invention. In this embodiment, part of the laser beam oscillated from the back side of the resonator of a semiconductor laser beam source 1 is received by a polarizer 19. Of the received laser output having only the light beam possessing a specific direction of polarization (for example, P-polarized component in a magneto-optical system) is substantially selected and is entered into a photo detector for monitoring 14. In this embodiment, the laser beam from the front side of the resonator of the laser substantially becomes the specified polarized component before reaching the optical disc.

The photo detector 14 receiving the laser beam having a specific direction of polarization converts it into an electric signal corresponding to the light intensity of the received laser beam, and delivers it into an optical output control circuit 15. In the optical output control circuit 15, first, a comparator circuit 16 compares the signal output from the photo detector 14 with a specified reference level. In a control circuit 17, then, based on the result of comparison, a control signal for controlling the driving current of the semiconductor laser beam source 1 is delivered In consequence, a driving current circuit 18 varies the driving circuit depending on the control signal, thereby stabilizing the output light intensity of the laser beam possessing the specified direction of polarization from the front side of the semiconductor laser beam source 1.

In this embodiment, the operation is same as in the first embodiment except that the laser beam to the photo detector for monitoring 14 is taken from the back side of the resonator, and the description of the operation is omitted here.

FIG. 3 shows a photo detector 14 integrally assembled into the polarizer 19, in which the polarizer 19 is attached to an optical window 22 provided in front of a case 21 and a photovoltaic transducer 20 is installed in the case. In this photo detector 14, the light beam entering from the laser beam source into the photovoltaic transducer 20 is designed to always pass through the polarizer 19. Of the light beam received by this polarizer 19, only the light beam having the specified direction of polarization is substantially selected and entered into the photovoltaic transducer 20. Therefore, the photovoltaic transducer 20 receives substantially only the specified polarized component out of the output light from the light source, and an electric signal is delivered according to the quantity of this received light (light intensity). The electric signal is entered into the optical output control circuit 17 same as in FIG. 1 and FIG. 2, and according to this light intensity information, it is controlled to stabilize the laser beam output having the specified direction of polarization from the laser beam source.

Therefore, the present invention provides a method for stabilizing the laser beam output by controlling the driving current of the laser beam source and a photo detector for use in the same method, by receiving an exit light from the laser beam source by the photo detector, converting it into an electric signal corresponding to the light intensity in this photo detector, and comparing this signal output with a predetermined reference level.

As evident from the description given above, according to the present invention, since the light intensity information of only the specified polarized component is obtained by detecting only the light beam of the specified polarized component to be actually used by the photo detector of the output light from the laser beam source, if the polarization ratio in the output beam increases or decreases or if the light intensity of laser beam varies due to rotation of the direction of polarization, the light intensity information obtained in the above photo detector is not different from the light intensity to be used actually used. Hence, the light intensity of the polarized component to be actually used can be controlled on the basis of this light intensity information, so that the light beam output may be accurately stabilized by this control.

While only certain embodiments of the present invention have been described, it will be apparent to those skilled in the art that various changes and modifications may be made therein without departing from the spirit and scope of the present invention as claimed.

What is claimed is:

1. An optical memory system comprising:
    laser means for producing a laser beam to read from, record onto and/or erase information from an optical disk;
    driving means for driving said laser means at various power levels;
    selection means for selecting only a laser beam having a specific direction of polarization from said laser beam outputted from said laser means;
    detection means for detecting light intensity of said laser beam having said specific direction of polarization passing through said selecting means and for converting said light intensity into an electric signal; and
    control means, responsive to said electrical signal, for varying a driving current utilized by said driving means to drive said laser means;
    said selection means receiving part of said laser beam from a front side of a resonator of said laser means prior to said laser beam being applied to said optical disk.

2. An optical memory system comprising:
    laser means for producing a laser beam to read from, record onto and/or erase information from an optical disk;
    driving means for driving said laser means at various power levels;
    selection means for selecting only a laser beam having a specific direction of polarization from said laser beam outputted from said laser means;
    detection means for detecting light intensity of said laser beam having said specific direction of polarization passing through said selecting means and for converting said light intensity into an electric signal; and
    control means, responsive to said electrical signal, for varying a driving current utilized by said driving means to drive said laser means;
    said selection means receiving part of said laser beam from a back side of said laser means.

3. The optical memory system as claimed in claim 1, wherein said specified direction of polarization is a P-polarization plane.

4. The optical memory system as claimed in claim 2, wherein said specified direction of polarization is a P-polarization plane.

5. A method of stabilizing a laser beam output for use in an optical memory system, comprising the steps of:
    (a) producing a laser beam having distinct power levels for recording or reproducing information;
    (b) splitting the laser beam into two laser beams, one laser beam having a greater power intensity than the other laser beam;
    (c) polarizing the split laser beam having the greater power intensity in a specific direction of polarization;
    (d) reflecting the polarized laser beam of said step (c) onto an optical disk;
    (e) polarizing the split laser beam having the lesser power intensity in the same specific direction of polarization as carried out in said step (c);
    (f) detecting light intensity of the polarized laser beam of said step (e); and
    (g) controlling the power level of the laser beam produced in said step (a) according to the detecting carried out in said step (f).

* * * * *